United States Patent [19]
Wen

[11] Patent Number: 5,457,737
[45] Date of Patent: Oct. 10, 1995

[54] METHODS AND APPARATUS TO VERIFY THE IDENTITY OF A CELLULAR MOBILE PHONE

[75] Inventor: Jack C. Wen, Parsippany, N.J.

[73] Assignee: AT&T Corp., Murray Hill, N.J.

[21] Appl. No.: 174,569

[22] Filed: Dec. 28, 1993

[51] Int. Cl.⁶ .............................. H04Q 7/22; H04M 11/00
[52] U.S. Cl. .................... 379/62; 379/63; 379/58; 379/59; 455/53.1
[58] Field of Search .................... 380/21, 23; 379/62, 379/59, 63, 58; 455/33.1, 54.1

[56] References Cited

U.S. PATENT DOCUMENTS

| | | | |
|---|---|---|---|
| 4,626,845 | 12/1986 | Ley | 380/23 |
| 4,955,049 | 9/1990 | Ghisler | 379/58 |
| 4,964,163 | 10/1990 | Berry | 380/23 |
| 5,077,790 | 12/1991 | D'Amico et al. | 379/62 |
| 5,091,942 | 2/1992 | Dent | 379/59 |
| 5,239,294 | 8/1993 | Flanders et al. | 379/63 |
| 5,293,576 | 3/1994 | Mihm, Jr. et al. | 380/21 |

*Primary Examiner*—Wing F. Chan
*Assistant Examiner*—William G. Trost

[57] ABSTRACT

A wireless-based communications system is provided with a method and apparatus for automatic verification of the identity of a mobile phone user in order to eliminate cellular piracy. A first embodiment implements a memory-based verification and a second embodiment implements an algorithm-based verification to reduce memory space requirements. The call is allowed when verification passes and is disallowed when verification fails.

30 Claims, 6 Drawing Sheets

METHODS AND APPARATUS TO VERIFY THE IDENTITY OF A CELLULAR MOBILE PHONE

FIELD OF THE INVENTION

The present invention relates to the automatic verification of the identity of a mobile telephone in a cellular service-based system prior to connecting a requested telephone call, and in particular to both a memory-based method and an algorithm-based method of verification.

BACKGROUND OF THE INVENTION

In present cellular service-based communications systems, verification of the legitimacy of a user's mobile phone has become a serious problem. Substantial revenues are lost by cellular service providers due to "cellular pirates" making calls by emulating legitimate users' phones. The problem primarily stems from the insufficient mechanisms to establish authentication of the mobile phones when a call is placed. Currently, the two basic requirements that a cellular system uses to establish verification of a mobile phone are the mobile phone number (also known as the Mobile Identification Number, or MIN) and the electronic serial number (ESN). Upon initiating a call, the mobile phone sends to the base station its own MIN and its ESN as well as other required information. The base station checks its internal memory to verify that the ESN is correct for the given MIN. However, when these numbers are transmitted over the air, "cellular pirates" can easily intercept these transmissions, decode the messages, and thus obtain the necessary numbers. Afterwards, the pirates can easily program an EPROM with the required numbers and install it in their cellular phone. Consequently, their cellular phone is capable of placing calls at the expense of the legitimate user without the system ever knowing of the deceit.

It is therefore an object of the present invention to provide in a cellular service-based communications system a method and means by which the legitimacy of a mobile phone user can be verified prior to connecting the cellular call without enabling the subsequent unauthorized use of the mobile phone access data by an eavesdropper.

It is a further object of the present invention to provide such a system which will allow a telephone call to be placed by a mobile phone after such verification passes and will prevent such a call to be placed when such verification fails.

It is a further object of the present invention to provide such a system which will allow the user a limited number of attempts to reaccess after failed verification before the system will alert the service provider and/or the legitimate user of multiple failed call attempts.

SUMMARY OF THE INVENTION

In accordance with these and other objects, provided are two alternative methods for a base station to automatically verify the identity of a mobile phone prior to establishing a communications link therewith: a memory-based method and an algorithm-based method. In both methods of the present invention, the password implemented between the base station and the mobile phone is not repeated from one transmission to the next, but rather is dynamic and synchronously changes from transmission to transmission.

In the memory-based aspect of the invention, the cellular system base station and the mobile phone each contain a common look-up table of unique code words in memory. The code word is a password by which the legitimate mobile user will gain access to the system. Each mobile phone contains a different look-up table and the base station contains an aggregate memory which comprises the look-up table for each mobile phone in a memory mapped space.

According to this memory-based embodiment, when the mobile phone initiates a call to the base station by the standard format (e.g. transmission of its MIN and its ESN), the base station interrogates the requesting mobile phone by transmitting to it, a unique interrogation address, and the mobile phone has to respond with the correct code word in order for a call to be processed. In order to respond to the interrogation, the mobile phone uses the interrogation address to access its look-up table and fetches the code word that the address points to. The code word is then transmitted back to the base station. The base station determines, in its corresponding look-up table mapped for the specific mobile phone unit (based on the received MIN and ESN), that the code word is indeed the correct code word it queried for. If correct, the call is placed. If incorrect, a warning signal is sent back to the mobile phone to notify the user that the system received the incorrect code word and that the call is denied.

Every time the mobile phone attempts a call, a different interrogation address is sent by the base station, and thus a different code word is sent from the mobile phone station's look-up table to the base station for verification. Since the look-up table in the memory map for the base station is identical to that stored in the particular mobile phone, the updated code word should always match that fetched in the base station for each attempted call. If the attempting mobile phone user is unauthorized, it will not contain the matching look-up table, and it will not be able to provide to the base the updated code word which it is requesting. Thus, according to this memory-based aspect of the present invention, even though a cellular pirate may have been able to intercept a prior communication and use the code word from that communication in an attempt to establish an unauthorized communication with the base station, the code word will be obsolete and the cellular pirate will never be able to provide the new code word requested by the base station. That is, the base station will always request a new and unique code word which the cellular pirate will be unable to predict or otherwise ascertain.

In the algorithm-based aspect of the present invention, a predetermined algorithm generates the code words at every call request as a function of the unique interrogation address and a predetermined seed word (e.g. Personal Identification Number, or PIN). This approach requires less memory in both the base station and the mobile phone than does the memory-based embodiment. For the base station the algorithm can reside in software, whereas for the mobile phone the identical algorithm would reside in firmware or on a smartcard, EPROM, etc. The algorithm would require only the selected interrogation address and applicable PIN number (stored in memory) to generate the corresponding code word.

In this algorithm-based method, there is a higher degree of complexity to protect against the deciphering of the PIN and thus provide additional security for the user's phone numbers. Additionally, the need to provide a deep memory for an adequate number of unique code words, as is true for the memory-based approach, is obviated.

According to the algorithm-based approach, standard messages are exchanged at call initiation between the mobile phone and the base station, except that for mobile phone identification, the mobile phone sends only its MIN but not its ESN. The base station validates the MIN. If valid, an interrogation address is sent to the mobile phone. If invalid, the call is immediately denied.

In response to the interrogation address, the mobile phone sends back to the base station a first encrypted message that has the ESN and the requested code word embedded in it and a second encrypted message with the dialed phone number and the same requested code word embedded together. The encryption method may be a known industry standard, familiar in the prior art. Since each encrypted message consists of two unknown pieces of data (i.e. the ESN and code word) that are convoluted together, the ESN as well as the dialed phone number are more secure and another degree of difficulty exists in trying to decipher the code word and the PIN. The worst case scenario envisioned is when the ESN, the MIN and/or the dialed number is known to the cellular pirate which makes it possible to decipher the code word. However, the PIN is still unknown and the user remains protected since the code word requested would be different on the next call attempt since the interrogation address will be different.

The base station uses the MIN it received at call initiation to look up in memory the expected ESN corresponding to the MIN. The base station then generates an expected code word by implementing the algorithm identical to that implemented by the mobile phone; it uses the PIN and the unique interrogation address as inputs to generate an expected code word for verification purposes.

Upon receipt of the encrypted messages, the base station deciphers the two messages by using the expected code word to extract the ESN and the dialed phone number. The base station then checks if the ESN is a valid number for the corresponding MIN. If valid, the call is completed. If not, the call is denied.

In both the memory-based and algorithm-based approaches, the base station can select new interrogation address words sequentially (e.g. by incrementing an up-counter) or pseudo-randomly. In order to avoid the repeated use of an interrogation address, the base station can keep track of those interrogation addresses and code words which have been used, and can raise a flag when a predetermined amount have been exhausted for a given mobile user. The memory look-up tables can then be replaced for both the mobile phone and the base station.

Since a new code word is required every time a call is placed, the old code words are rendered useless to a cellular pirate eavesdropping on the call. A sufficient number of code words would be available to last several months or years before new code words would be required. Code words would also be sufficient in length (e.g., greater than 17 decimal digits) to increase the difficulty in deciphering the code generation technique. For the memory based look-up table approach, since the method in which the code words are generated is known only by the service provider and can completely be arbitrary, it would almost be impossible for anyone else to decipher the code generation method. Furthermore, several methods of code generation can be used and new schemes can replace old ones periodically.

If desired, code words for both methods are updated by the service provider sending the user a new plug-in EPROM, smart card, PIN, etc. Alternatively, for the algorithm-based approach, PINs can be manually entered into the mobile phone instead of inserting a physical device (e.g. smartcard, EPROM, etc.) which makes it more convenient and cost effective for the service provider and user. During the transition time, when code words/PINs are being updated, the base station will automatically tell the user's mobile phone to switch to the new set of code words/PINs at the time a call is placed. Also, for added security and a means to reduce costs, several PINS can be given to the user at one time and stored in the mobile phone's memory, smart card memory, EPROM, etc. When a PIN expires or is discarded, the system can automatically tell the mobile phone to switch to a new PIN. In this way, service does not need to be interrupted for an extremely long period of time.

In case a cellular pirate makes repeated attempts to make a call, the system can have safeguards to protect against this type of action. If a given number of calls are attempted and denied in a given time, the system will set a flag indicating this condition. The service provider is alerted to this situation and may try to notify the user immediately by direct phone calls, a page message, mail, etc. Other actions can also be taken by the service provider as well. Once the flag is set, the legitimate user, at the time he places a call, will also be alerted to this condition. The system does not prevent any calls from being completed, however, it is left to the choice of the user to call the service provider (e.g. via a special service number) that he wants appropriate action to be taken (e.g. mail/fax a new smartcard, PIN etc.). Calls are still permitted in these situations to allow for emergency calls, connection problems, system problems, or phone trouble experienced by the legitimate user.

DESCRIPTION OF THE PREFERRED EMBODIMENT

Figure 1:
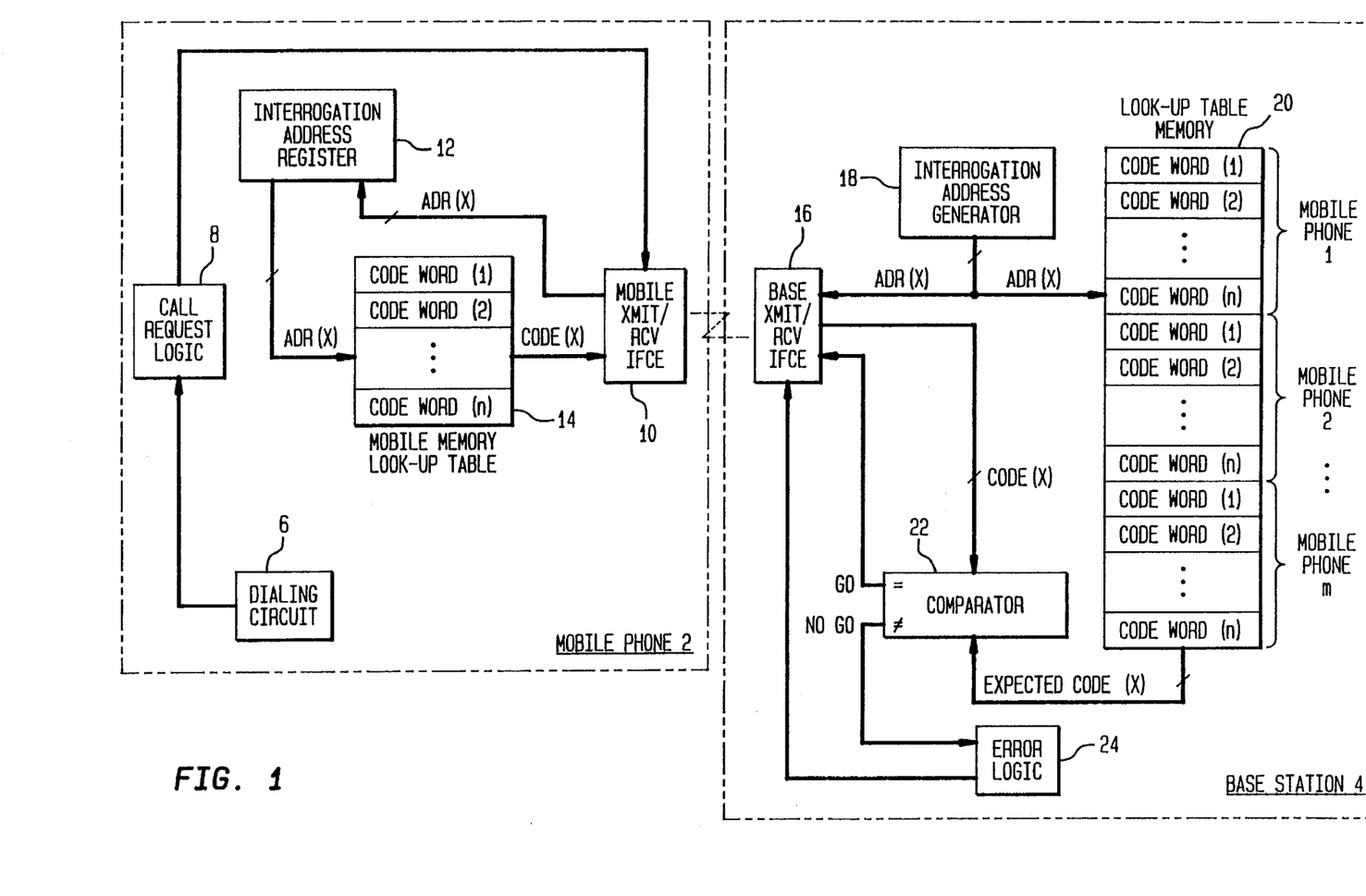
FIG. 1 is a block diagram of the preferred embodiment of the memory-based system of the present invention.
Figure 2:
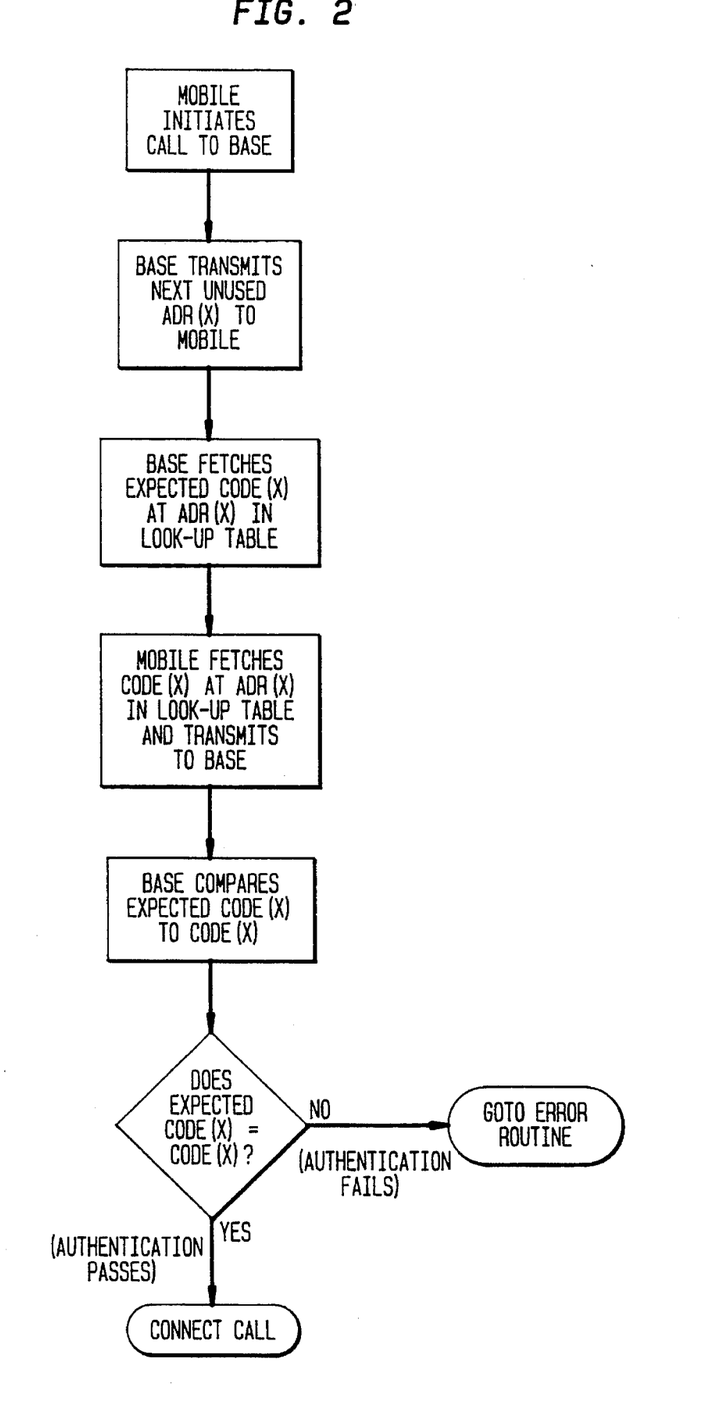
FIG. 2 is a flowchart of the operation of a preferred embodiment of the memory-based method of the present invention.

Referring to FIGS. 1 and 2, the operation of the preferred embodiment of the memory-based method of the present invention will now be described in greater detail. FIG. 1 illustrates a block diagram of a base station 4 and one mobile phone 2; it is understood that a complete system will have a plurality of equivalent mobile phones.

The user, desiring to place a cellular call from a mobile phone 2, dials the call in the usual fashion via a standard dialing circuit 6. The mobile phone 2 initiates the call to the base station 4 through a call request circuit 8 by sending the standard required messages such as the dialed phone number, the ESN, etc., via a standard interface circuit 10. Upon receipt of the call request messages through its standard interface circuit 16, the base station 4 performs an initial verification that the mobile phone 2 has not been disabled from the system (e.g. for non-payment of bills). The base station 4 then transmits a unique interrogation address ADR(X) from an interrogation address generator 18 to the mobile phone 2. ADR(X) can be generated by a pseudo-random number generator, or can be supplied by a counter which is incremented by one for every attempted call by the mobile phone 2. As long as ADR(X) is revised for every transmission attempt by a mobile phone 2, the particular method of generation is not critical.

The base station 4 also fetches from a look-up table memory 20 the unique code word EXPECTED CODE(X) stored at the particular interrogation address ADR(X) that it sent to the mobile phone 2. In the preferred embodiment, the base station will have its memory map 20 allocated such that each mobile phone 2 on the network has a dedicated space for its own look-up table; each look-up table being different for each mobile phone 2. When the requesting mobile phone 2 initially sends its MIN, the MIN is used to access the particular memory space, and the interrogation address ADR(X) selects the unique code word EXPECTED CODE(X) from that space. As shown in FIG. 1, the memory map 20 is divided into look-up tables for (m) mobile phones 2.

The mobile phone 2 has stored internally a look-up table 14 which is identical to that stored in the base station 4 and allocated for that particular mobile phone. Thus, when the mobile phone 2 receives the interrogation address ADR(X) from the base station 4, it fetches from its look-up table 14 a code word CODE(X) and transmits it to the base station 4 for subsequent verification.

Upon receipt of CODE(X), the base station 4 compares CODE(X) with EXPECTED CODE(X) from its memory 20 via a comparator circuit 22. If EXPECTED CODE(X) is the same as CODE(X), the verification passes and the call is completed in the usual manner. If, however, CODE(X) is not the same as EXPECTED CODE(X), the verification fails, the call is denied, and the base station enters into an appropriate error routine, which is carried out by error logic circuit 24 as described below.

By constantly changing the interrogation address ADR(X) for every transmission attempt, a cellular pirate who is successful in capturing and repeating a coded transmission will be thwarted since the code word is obsolete as soon as it is used. The look-up tables in memory will need to be updated once they have been cycled through once in order to achieve maximum security. Thus, for a look-up table that is 2K deep, a user can attempt three calls per day for almost two years before the memory must be replaced.

Figure 3:
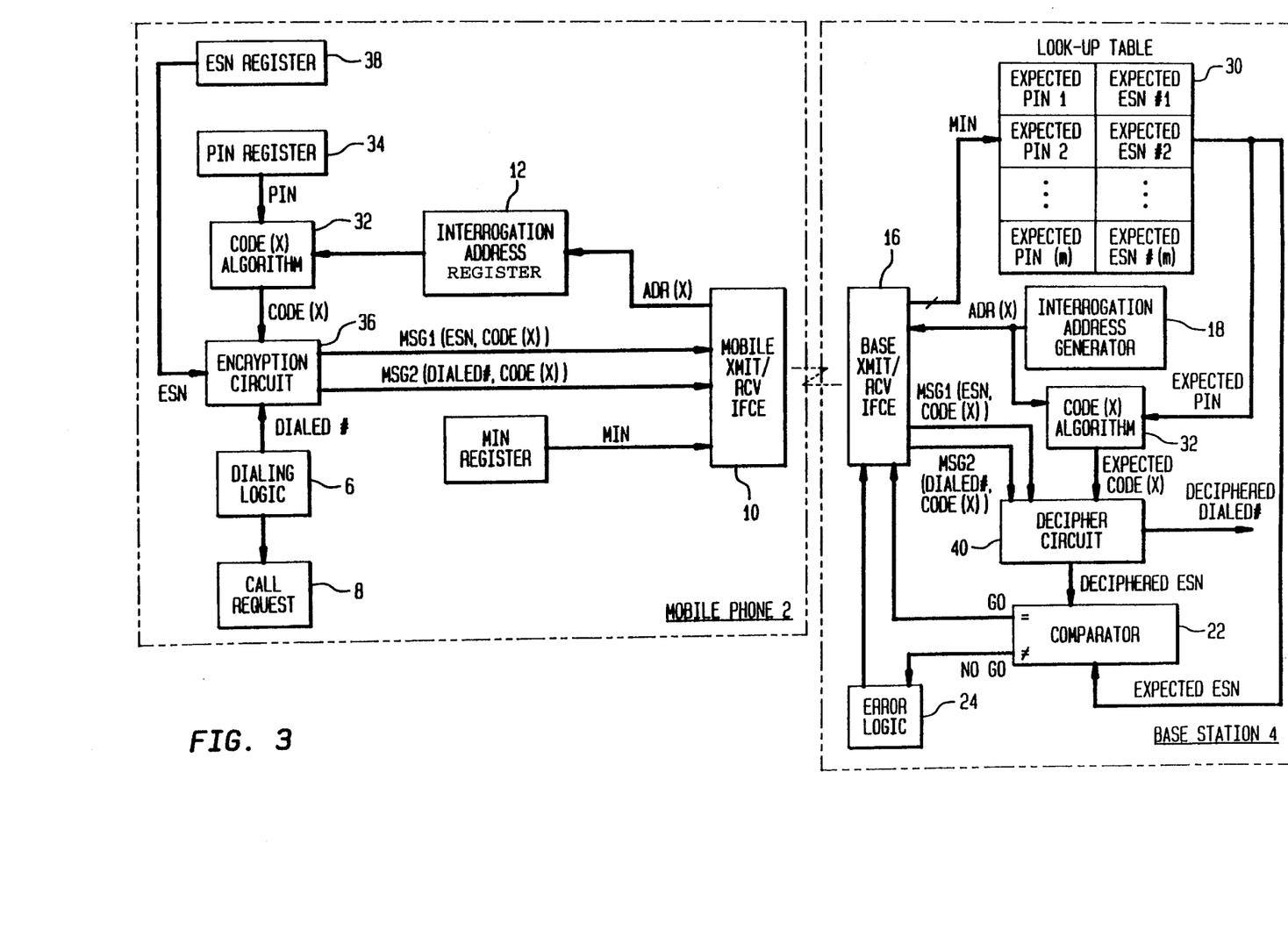
FIG. 3 is a block diagram of the preferred embodiment of the algorithm-based system of the present invention.
Figure 4A:
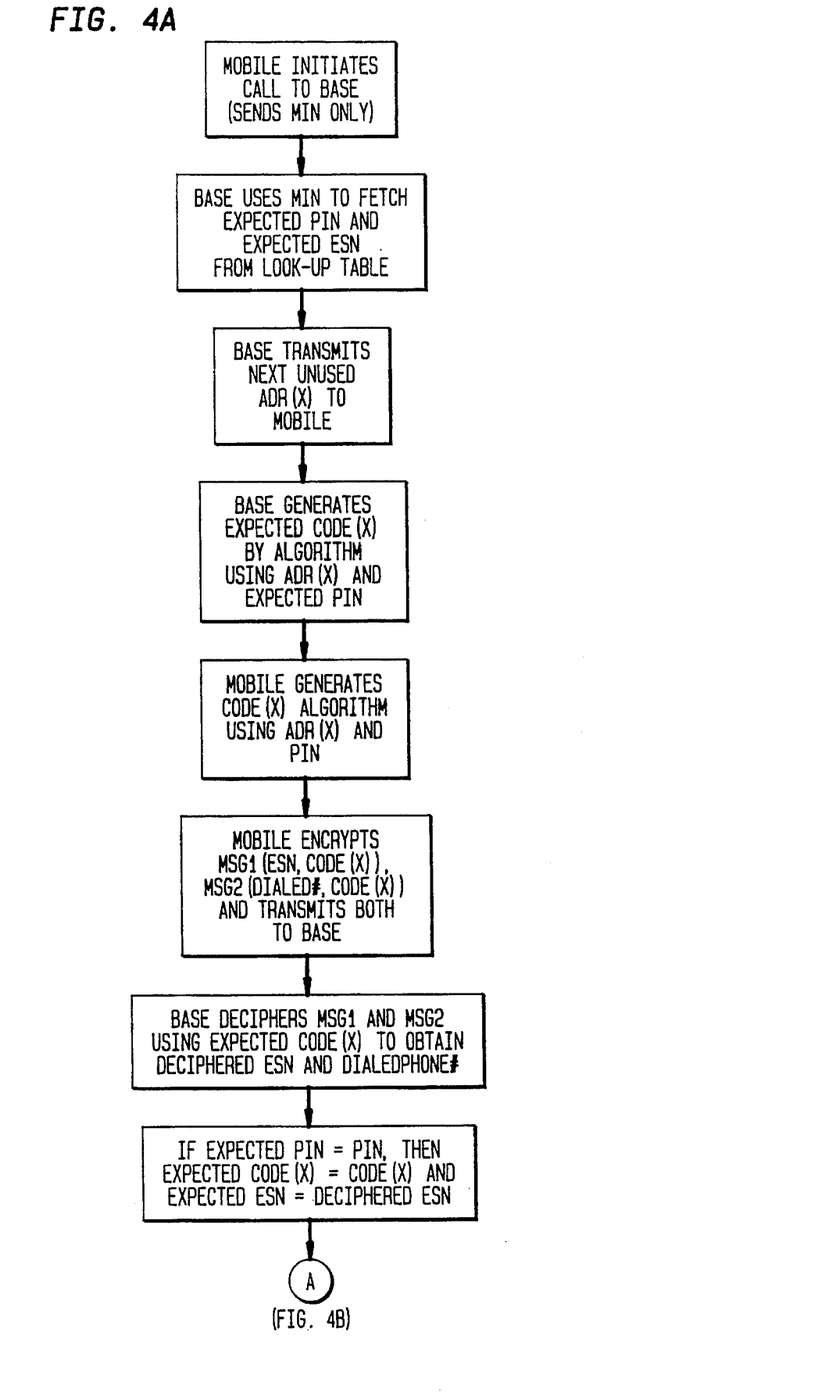
FIGS. 4A and 4B are a flowchart of the operation of the algorithm-based method of the present invention.
Figure 4B:
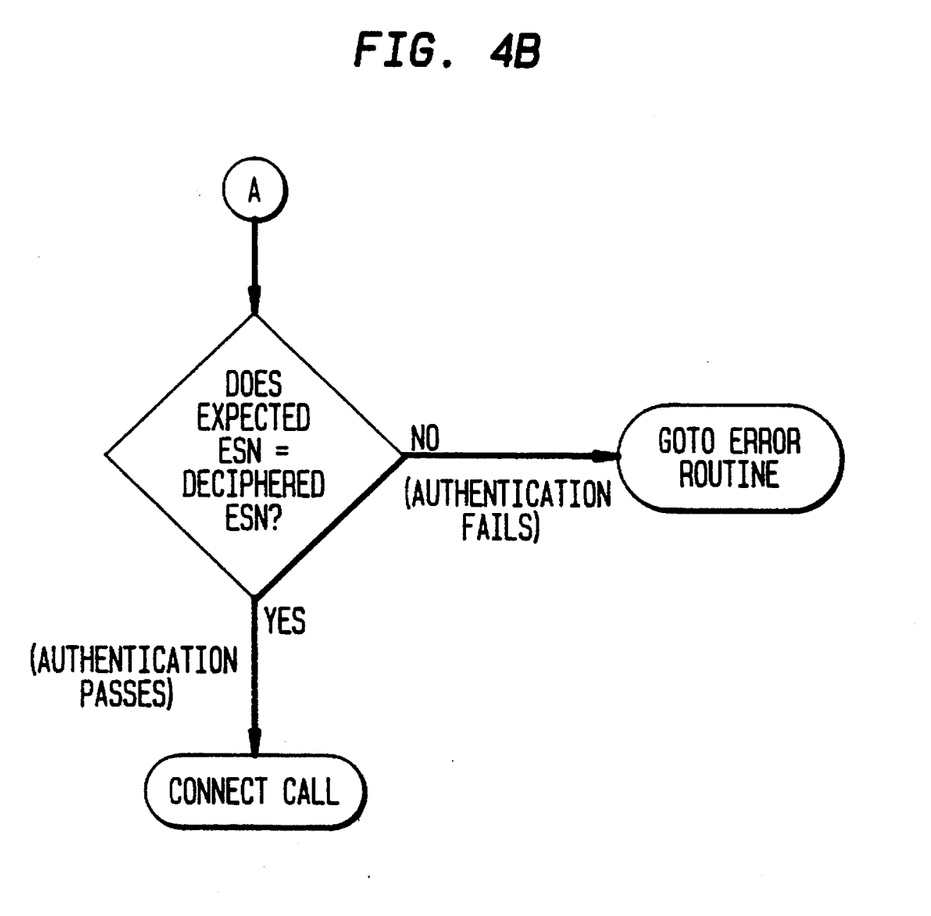

The algorithm-based method of the present invention eliminates the need to change the look-up table after it has been exhausted. The preferred embodiment of the algorithm-based method of the present invention is shown by the flowchart of FIGS. 3, 4A and 4B. Items which are the same or substantially as shown in FIG. 1 are given like reference numerals for convenience. The mobile phone 2 attempts to place a phone call by sending to the base station 4 the usual messages, but for this algorithm-based method sends only its MIN and not the ESN. The base station 4 uses the received MIN to access in a look-up table memory 30 the PIN number and ESN associated with the received MIN, which are designated EXPECTED PIN and EXPECTED ESN, respectively. EXPECTED PIN and EXPECTED ESN are the same for every transmission attempt by a particular mobile phone 2, and need not be revised or changed for subsequent transmission attempts. The look-up table memory 30 is thus a repository of PINs and ESNs associated with the MIN for each mobile phone in the system.

As with the memory-based method, the base station 4 transmits a unique interrogation address ADR(X) from the interrogation address generator 18 to the interrogation address register 12 of the mobile phone 4. Again, ADR(X) can be generated by a pseudo-random number generator, or can be supplied by a counter which is incremented by one for every attempted call by the mobile phone 2. As with the memory-based method, as long as ADR(X) is revised for every transmission attempt by a mobile phone 2, the particular method of generation is not critical.

The base station 4 then uses the unique ADR(X) and EXPECTED PIN from the look-up table 30 as inputs to a software-based algorithm 32 which generates a unique code word EXPECTED CODE(X). EXPECTED CODE(X) will change for every transmission attempt since ADR(X) is revised for every transmission attempt.

The algorithm used in the preferred embodiment can be an open industry standard determined by the standards committees or a completely proprietary algorithm created by the service provider. In the latter case, the proprietary algorithm can be conveyed to the mobile phone via smart cards, EPROMS, etc. Furthermore, the algorithm need not be downloaded to the mobile phone, but can reside within the smart card, EPROM, etc.

The mobile phone 2 has the identical algorithm 32 stored in firmware. Thus, upon receipt of the interrogation address ADR(X), the mobile phone generates a code word CODE(X) based on ADR(X) and its internally stored PIN as inputs. Thus, EXPECTED CODE(X) generated by the base station 4 should be the same as CODE(X) since the EXPECTED PIN fetched at the base station 4 should be the same as the PIN number used by the mobile phone 2.

The mobile phone 2 then uses CODE(X) to generate two distinct coded messages. The mobile phone 2 uses a standard data encryption process 36 that can be an open industry standard or a proprietary process known only by the service provider to form a first message MSG1 from the mobile phone ESN and CODE(X) as inputs, and a second message MSG2 from the dialed phone number DIALED# and CODE(X) as inputs. The messages MSG1 and MSG2 are then transmitted to the base station.

Upon receipt, the base station uses the EXPECTED CODE(X) it previously calculated and deciphers, via deciphering means 40, the received messages MSG1 and MSG2 to obtain DECIPHERED ESN and DECIPHERED DIALED#. The comparator 22 then compares the DECIPHERED ESN against the EXPECTED ESN it fetched previously from the look-up table 30. If the two variables are the same, the verification passes, and the call is connected. If the verification fails, the error routine is entered as will be described below.

Figure 5:
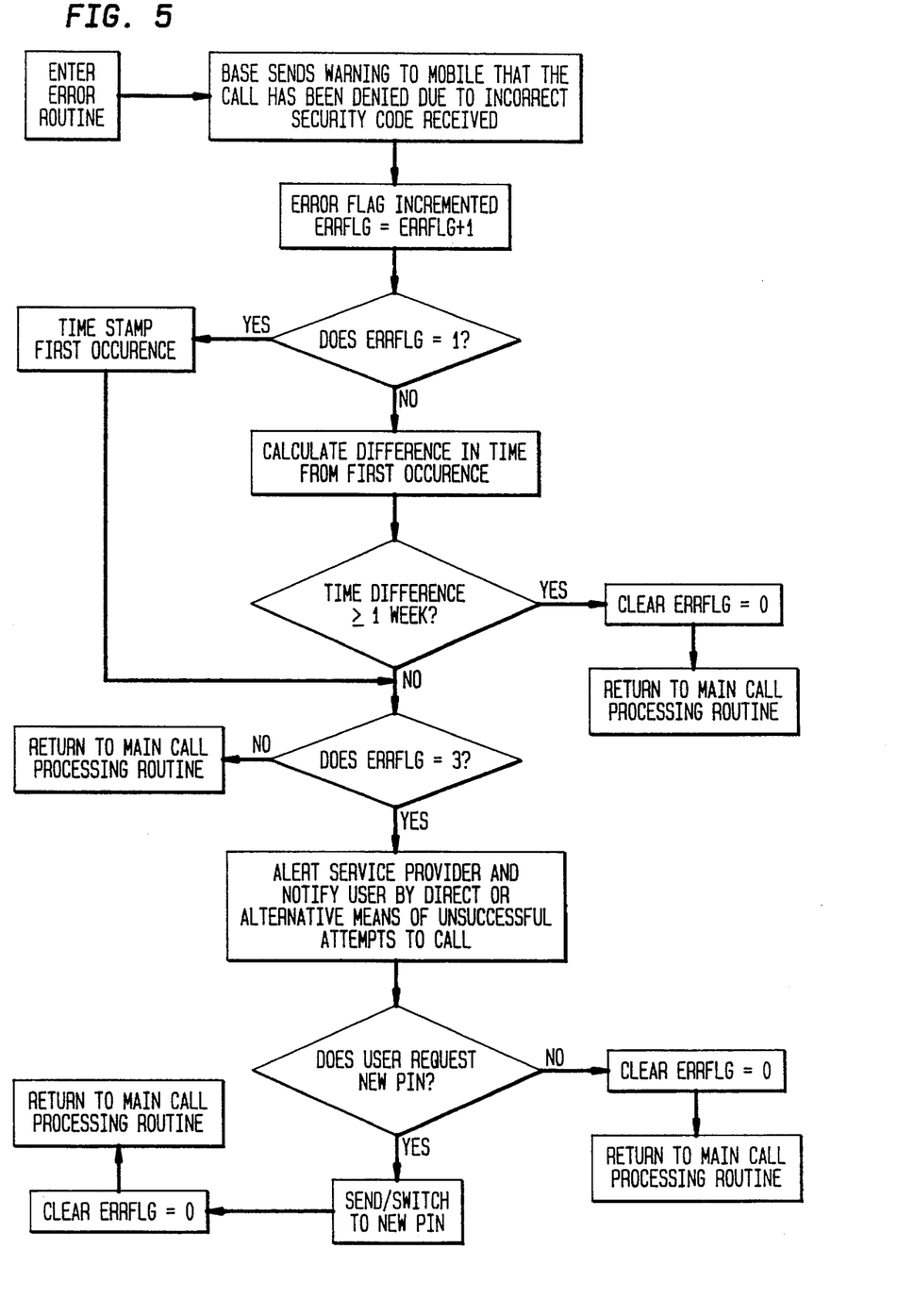
FIG. 5 is a flowchart of the operation of the error routine common to both methods of the present invention.

FIG. 5 illustrates the error routine which is common to both the memory-based method and the algorithm-based method of the present invention. Upon failure of verification, the base sends a warning message to the mobile that the verification has failed. An error flag ERRFLG is incremented and checked to determine if a certain preset number of errors have occurred in succession in a given amount of time. In the preferred embodiment, a preset number of three errors are allowed to occur within one week. If more than three errors have occurred, the only action the system will take is to alert the service provider of this condition. No additional action will be taken by the system. That is, the system does not inhibit any calls but will continue to allow further calls to be completed provided that the correct code word is received. However, the error flag ERRFLG remains the same. Once the service provider is aware of the condition, it can immediately notify the legitimate user of the multiple failed attempts and take whatever additional action. Notification of this situation to the legitimate user can be by phone calls directly to the user's mobile phone or landline phones, paging messages to the user's mobile phone (if equipped with this feature), or written notification (e.g. mail or fax). Additionally, every time a call passes initial verification, the system will interrupt the beginning of the call to play a short message indicating that there were multiple failed call attempts. This message would continue to play every time a call passes verification until ERRFLG is reset. If the legitimate user believes that illegitimate call attempts have been made, he/she can request a change in the PIN from the service provider. After the PIN has been changed, the error flag ERRFLG would then be reset. If the legitimate user does not suspect unauthorized use, ERRFLG would be reset and service would resume normally.

The error routine of FIG. 5 is implemented by the error logic 24 by using any means known in the art for accomplishing the required functions (e.g. counting means, comparator means and the like).

For privacy and security applications, the code words can also be used to scramble voice and data during calls.

Although the methods and apparatus of the present invention has been described with reference to the verification of a mobile phone in a cellular phone system, such methods and apparatus can also be used in new emerging wireless systems such as the Personal Communications Services (PCS) and wireless LAN applications. In addition, said verification system can be implemented in any wireless communications system which may be susceptible to piracy by illegitimate users.

I claim:

1. A method for a base station in a wireless-based communications system to automatically verify the identity of a mobile phone prior to connecting a requested wireless call, the method comprising the steps of:

(a) receiving a request by the mobile phone to the base station to connect a wireless call;

(b) transmitting in response to the request a unique interrogation address from the base station to the mobile phone;

(c) fetching from memory in the base station an expected code word, the expected code word residing at the location specified by the unique interrogation address;

(d) fetching from memory in the mobile phone a unique code word, the unique code word residing at the location specified by the unique interrogation address;

(e) transmitting the unique code word from the mobile phone to the base station;

(f) verifying that the expected code word fetched from the base station memory is the same as the unique code word received from the mobile phone;

(g) connecting the requested wireless call only when the code words are the same; and (h) denying the requested wireless call when the code words are not the same.

2. The method of claim 1 comprising the additional step of (i) changing the unique interrogation address prior to a subsequent verification whereby the unique code word fetched from the mobile phone memory and the expected code word fetched from the base station memory are different from prior verifications.

3. The method of claim 2 in which the interrogation address changing step is effected incrementally.

4. The method of claim 2 in which the interrogation address changing step is effected pseudo-randomly.

5. The method of claim 2 comprising the additional step of:

(j) informing the mobile phone that the requested wireless call has been denied.

6. The method of claim 5 comprising the additional steps of:

(k) counting the number of failed verifications within a preset time period; and (l) alerting the service provider when the number of failed verifications within a preset time period is more than a preset amount.

7. In a wireless-based communications system having a base station and at least one mobile phone, apparatus for automatically verifying the identity of a mobile phone prior to connecting a requested wireless call comprising:

(a) means in the mobile phone to request the connection of a wireless call:

(b) means in the base station to generate and transmit a unique interrogation address in response to the mobile phone request;

(c) memory means in the base station for storing a set of expected unique code words reserved for each mobile phone in the wireless-based system;

(d) memory means in the mobile phone for storing a set of unique code words identical to the set reserved in the base station memory means for the particular mobile phone;

(e) means to provide to the base station the unique code word from the mobile phone memory means which corresponds to the unique interrogation address;

(f) means in the base station to compare the mobile phone code word with the expected code word from the base station memory means which corresponds to the unique interrogation address; and (g) means for connecting the wireless call only when the mobile phone code word is the same as the base station expected code word and for denying the connection of the wireless call when the mobile phone code word and is not the same as the base station expected code word.

8. The wireless-based communications system of claim 7 further comprising:

(h) means for changing the unique interrogation address prior to a subsequent verification whereby the unique code word from the mobile phone memory means and the expected code word from the base station memory are changed from prior verifications.

9. The wireless-based communications system of claim 8 in which the address changing means is an incremental counter.

10. The wireless-based communications system of claim 8 in which the address changing means is a pseudo-random number generator.

11. The wireless-based communications system of claim 8 further comprising:

(i) means for informing the mobile phone that the requested wireless call has been denied.

12. The wireless-based communications system of claim 11 further comprising:

(j) means for counting the number of failed verifications within a preset time period; and (k) means for alerting the service provider when the number of failed verifications within a preset time period is more than a preset amount.

13. In a wireless-based communications system comprising a plurality of mobile phones and a base station capable of communicating with each of the mobile phones, a system for verifying the identity of any of the mobile phones wherein:

(a) each of the mobile phones comprises:
  (i) means to request the connection of a wireless call,
  (ii) means to receive a unique interrogation address provided by the base station in response to the request,
  (iii) memory means for storing a set of predetermined unique code words, and
  (iv) means to provide to the base station a unique mobile phone code word from the memory means which corresponds to the unique interrogation address, and (b) the base station comprises:
  (i) means to provide a unique interrogation address to a mobile phone in response to a request by the mobile phone to establish a wireless call,
  (ii) means to receive a unique mobile phone code word provided by the mobile phone in response to the unique interrogation address,
  (iii) memory means for storing a plurality of sets of unique expected code words, wherein each set of expected code words is identical to a set of unique code words stored in memory means in each mobile phone,
  (iv) means to compare the expected code word corresponding to the interrogation address with the received unique mobile phone code word, and
  (v) means to allow the connection of a wireless call only when the unique mobile phone code word is the same as the expected code word and for disallowing the connection of a wireless call when the unique mobil phone code word and is not the same as the expected code word.

14. The wireless-based communications system of claim 13 wherein the base station further comprises:
  (b)(vi) means for changing the unique interrogation address prior to a subsequent verification whereby the unique code word from the mobile phone memory means and the expected code word from the base station memory are changed from prior verifications.

15. The wireless-based communications system of claim 14 in which the address changing means is an incremental counter.

16. The wireless-based communications system of claim 14 in which the address changing means is a pseudo-random number generator.

17. The wireless-based communications system of claim 14 wherein the base station further comprises:
  (b)(vii) means for informing the mobile phone that the requested wireless call has been denied.

18. The wireless-based communications system of claim 17 wherein the base station further comprises:
  (b)(viii) means for counting the number of failed verifications within a preset time period; and
  (b)(ix) means for alerting the service provider when the number of failed verifications within a preset time period is more than a preset amount.

19. A method for a base station in a wireless telephone system to automatically verify the identity of a mobile phone prior to connecting the mobile phone with a dialed phone, the method comprising the steps of:

(a) receiving a request by the mobile phone to the base station to connect with the dialed phone;
(b) providing to the base station from the mobile phone a mobile phone number dedicated to the mobile phone for identifying to the base station the particular mobile phone requesting the phone call;
(c) fetching from memory in the base station an expected PIN and an expected electronic serial number corresponding to the received mobile phone number;
(d) transmitting a unique interrogation address from the base station to the mobile phone;
(e) implementing in the base station a predetermined algorithm to generate an expected code word as a function of the unique interrogation address and the expected PIN;
(f) implementing in the mobile phone the predetermined algorithm to generate a code word as a function of the unique interrogation address and the mobile phone PIN;
(g) encrypting in the mobile phone a first message as a function of the electronic serial number and the generated code word and a second message as a function of the dialed phone number and the generated code word;
(h) transmitting the first and second encrypted messages to the base station;
(i) deciphering in the base station the received messages by using the expected code word to obtain a deciphered electronic serial number and a deciphered dialed phone number;
(j) verifying that the expected mobile phone number fetched from the base station memory is the same as the deciphered electronic serial number;
(k) connecting the wireless call with the deciphered dialed phone number only when verification passes; and
(l) disallowing the phone call when the verification fails.

20. The method of claim 19 comprising the additional step of:
  (m) changing the unique interrogation address prior to a subsequent verification whereby the unique code word generated by the algorithm in the mobile phone and the expected code word generated by the algorithm in the base station are different from prior verifications.

21. The method of claim 20 in which the interrogation address changing step is effected incrementally.

22. The method of claim 21 in which the interrogation address changing step is effected pseudo-randomly.

23. The method of claim 20 comprising the additional step of:
  (n) informing the mobile phone that the requested wireless call has been denied.

24. The method of claim 23 comprising the additional steps of:
  (o) counting the number of failed verifications within a preset time period; and
  (p) alerting the service provider when the number of failed verifications within a preset time period is more than a preset amount.

25. In a wireless-based communications system having a base station and at least one mobile phone, apparatus for automatically verifying the identity of a mobile phone prior to connecting a requested wireless call comprising:

(a) means in the mobile phone to request the connection of a wireless call:
(b) means in the mobile phone to provide to the base station a mobile phone number dedicated to the mobile phone for identification of the particular mobile phone requesting the call;

(c) memory means in the base station for storing an expected PIN and an expected electronic serial number corresponding to the mobile phone number for each mobile phone in the system;

(d) means in the base station to generate and transmit a unique interrogation address in response to the mobile phone request;

(e) means in the base station to implement a predetermined algorithm to generate an expected code word as a function of the unique interrogation address and the expected PIN corresponding to the mobile phone number received from the mobile phone;

(f) means in the mobile phone to implement the predetermined algorithm to generate a code word as a function of the unique interrogation address received from the base station and of the mobile phone's PIN;

(g) means in the mobile phone to encrypt a first message as a function of the electronic serial number and the generated code word and a second message as a function of the dialed phone number and the generated code word;

(h) means to transmit the first and second encrypted messages to the base station;

(i) means in the base station to decipher the received encrypted messages by using the expected code word to obtain a deciphered electronic serial number and a deciphered dialed phone number;

(j) means in the base station to verify that the expected electronic serial number fetched from the base station memory is the same as the deciphered electronic serial number;

(k) means in the base station to connect the wireless call with the deciphered dialed phone number only when verification passes and to disallow the wireless call when the verification fails.

26. The wireless-based communications system of claim 25 further comprising:

(l) means for changing the unique interrogation address prior to a subsequent verification whereby the unique code word generated by the algorithm in the mobile phone and the expected code word generated by the algorithm in the base station are different from prior verifications.

27. The wireless-based communications system of claim 26 in which the address changing means is an incremental counter.

28. The wireless-based communications system of claim 26 in which the address changing means is a pseudo-random number generator.

29. The wireless-based communications system of claim 26 further comprising:

(m) means for informing the mobile phone that the requested wireless call has been denied.

30. The wireless-based communications system of claim 29 further comprising:

(n) means for counting the number of failed verifications within a preset time period; and (o) means for alerting the service provider when the number of failed verifications within a preset time period is more than a preset amount.

* * * * *